Feb. 8, 1949. C. R. LIVERMON 2,461,288
AIRCRAFT LANDING GEAR
Filed April 10, 1945
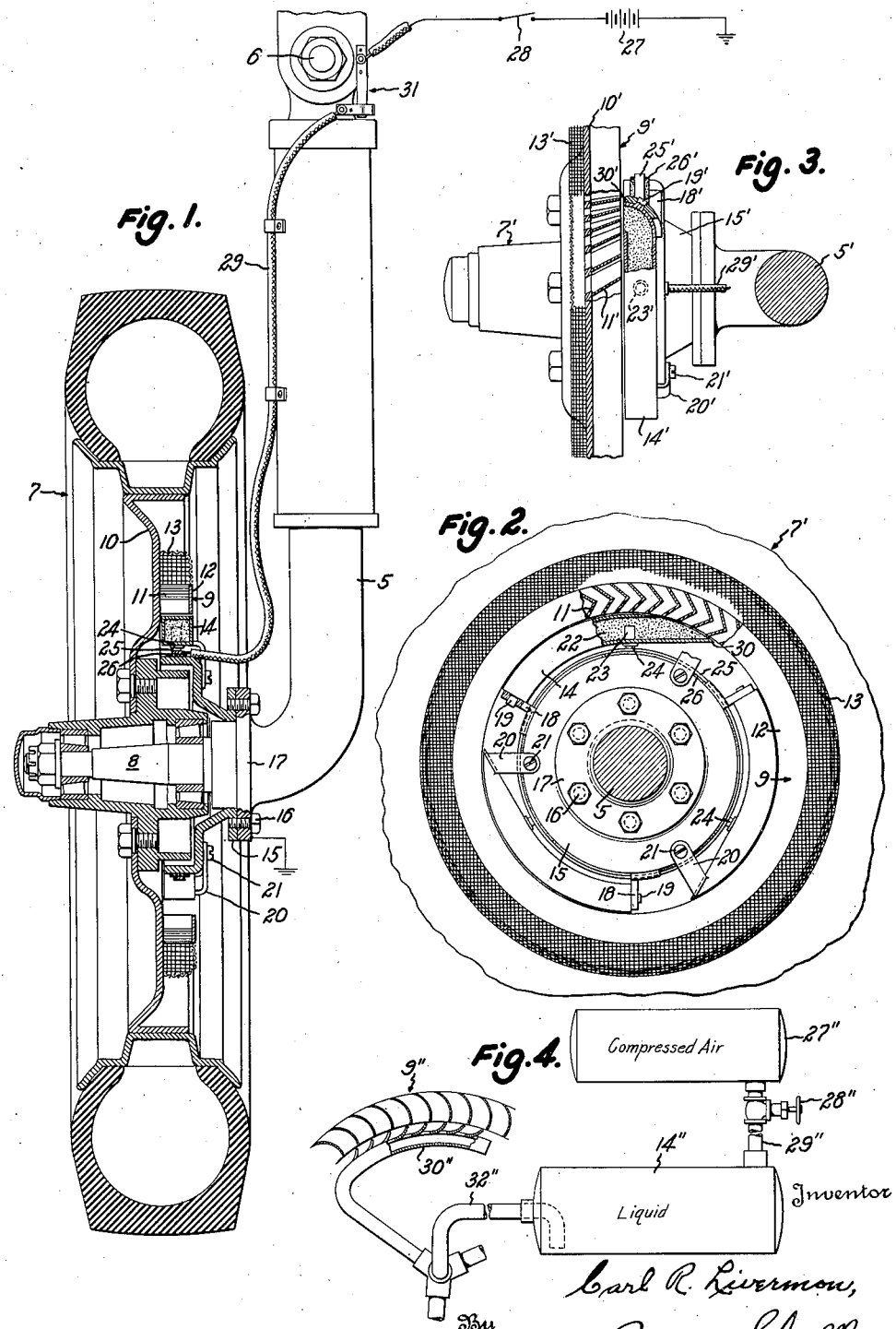
Inventor:
Carl R. Livermon,
By Pierce + Scheffler,
Attorneys.

Patented Feb. 8, 1949

2,461,288

UNITED STATES PATENT OFFICE 2,461,288

AIRCRAFT LANDING GEAR

Carl R. Livermon, Roxobel, N. C.

Application April 10, 1945, Serial No. 587,511

6 Claims. (Cl. 244—103)

This invention relates to aircraft landing gear and more particularly to gear wherein the landing wheels are given a forward spin preparatory to landing for the purpose of reducing tire wear and minimizing landing shock.

An object of the invention is to provide greatly improved landing gear of this type utilizing dynamic energy of fluid to impart rotation to the wheels.

Another object is to provide fluid driven turbine means for rotating the wheels.

Another object is to provide landing gear having a turbine rotor element associated with a landing wheel and power means associated with the relatively fixed structure of the aircraft for directing impelling fluid against the rotor.

Still another object is to provide, in such landing gear, wheel starting means employing an explosive substance to furnish the necessary power.

Other objects and advantages of the invention will be in part apparent and in part pointed out in the following description when considered in connection with the accompanying drawing, wherein:

Fig. 1 is a sectional view of a landing wheel and strut embodying the invention, parts being shown in elevation;

Fig. 2 is a right side partial view of the wheel of Fig. 1, partly in section, and with other parts broken away;

Fig. 3 is a plan view of a modified form of wheel and strut embodying the invention; and Fig. 4 is a schematic view illustrating a further modification.

Referring particularly to Figs. 1 and 2 of the drawing, depicting the presently preferred form of the invention, there is shown one element of a conventional retractable aircraft landing gear including the usual strut 5, pivoted at 6 to the aircraft for retraction by conventional means (not shown). It will be understood that the strut is shown in landing position, and that it may be pivoted in a counterclockwise direction for retraction. A wheel 7 is mounted on suitable bearings on a spindle 8 carried by the strut.

The wheel starter of the invention comprises, in brief, a bladed turbine rotor mounted on the landing wheel and means carried by a relatively fixed part of the aircraft for directing a stream of fluid at high velocity against the blades of the turbine rotor to impel the rotor and thus to drive the wheel.

The turbine rotor, designated by the general reference numeral 9, may be constructed, as shown, by welding to the disc portion 10 of the wheel a number of blades or cups 11 and suitably securing to the axially inner edges of the blades, as by welding, a ring 12. There is thus provided a bladed turbine rotor through which an impelling fluid may flow radially outward. About the periphery of the rotor there is secured an annular safety screen 13, through which impelling fluid, such as gas, leaving the rotor blades must pass in order to reach the atmosphere. The safety screen may have one of its edges welded to the outer edge of ring 9 and the other of its edges welded to the disc portion 10 of the wheel. The purpose of the safety screen will be more particularly pointed out hereinafter. It will be apparent that the turbine rotor, the safety screen, and the wheel form an integral structure, and that torque applied to the rotor will be transmitted directly to the wheel.

The preferred means for directing a stream or jet of impelling fluid against the blades of the rotor is shown in Figs. 1 and 2 as comprising a plurality of open-ended cartridges 14 carried by an annular supporting frame 15, fastened by screws 16 to a flange 17 forming a part of the strut 5. As best seen in Fig. 2, each cartridge is removably supported on the frame, the rear of the cartridge being supported by a bracket 18 secured to the frame 15, a pin 19 being provided at the rear of the cartridge case for engagement in a hole in the bracket. The forward end of the cartridge is supported by means of an integral arm 20 fastened to the frame by a screw 21. Spent cartridges may be readily replaced by removing screws 21, whereupon the cartridges may be bodily removed. Fresh cartridges may then be substituted.

The cartridges 14 are filled with an explosive substance 22 such as rocket or propellant powder, and each cartridge is provided with an electric squib 23 for igniting the charge. The squib is of the single wire type, being grounded to the cartridge case and having a terminal 24 which makes electrical contact with a contact ring 25 carried by an insulating ring 26 upon the frame 15. The squibs are fired from battery 27 by switch 28, the circuit being completed through ground on one side and on the other side through lead wire 29 attached to contact ring 25.

It will be observed that the forward ends 30 of the cartridge cases are open to provide nozzles for the issuance of gaseous powder combustion products and to direct the stream of gaseous products against the blades 11 of the turbine rotor for driving the latter. The powder gases pass through the rotor, giving up some of their energy and thence pass through the safety screen 13, which serves to cool the gases and arrest sparks, thereby minimizing the likelihood of damage to the aircraft.

In order to obviate accidental discharge of the cartridges when the wheels are retracted, a safety switch 31 is included in the insulated part of the electric circuit. One element of the switch is carried by the movable part of the strut and the other element is carried by the fixed part. It will be apparent from inspection of the drawing that the switch will be open when the landing wheel is in retracted position so that accidental operation of switch 28 will not serve to fire the cartridges.

In operation, the wheels of the aircraft are lowered preparatory to landing. Just prior to making contact with the ground, switch 28 is closed and the cartridges are fired. Combustion gases at high velocity impinge upon the blades of the rotor and cause the latter to rotate, which motion is imparted to the wheels. It will be understood that the quantity of powder employed will be chosen with regard to the moment of inertia of the wheel, to the landing speed of the aircraft, and to other factors involving considerations of mere design, as well known to those skilled in the art to which this invention pertains.

The modification of the invention shown in Fig. 3 differs from that shown in Figs. 1 and 2 primarily in that the flow of impelling gases through the turbine is in a direction axially of the wheel rather than radially. This requires certain structural changes which will be readily understood in the light of the previous description. In Fig. 3, parts analogous to those previously described will be designated by the same reference numerals, to which primes have been appended.

The turbine rotor 9' has passageways between the blades 11' which are open at the right and left hand sides, as seen in Fig. 3. The blades 11' serve as wheel spokes in addition to performing their normal function in the rotor. Safety screen 13' overlies the low pressure openings of the turbine rotor and cools the issuing gases to prevent damage to the aircraft.

The cartridges 14' have side openings 30' directed towards the rotor. The cartridges are removably supported on the frame 15' in a front bracket 18' by a lug 19' received in a hole in the front bracket, and by a rear arm 20' fastened to the frame by means of a screw 21'. The electrical circuit for firing the squibs 23' is similar to that described in connection with Figs. 1 and 2 and includes contact ring 25' and lead wire 29'. The contact ring is mounted on the insulating ring 26'.

The operation of the wheel starter shown in Fig. 3 is identical with the operation of that shown in Fig. 1 and 2, and the cartridges are just as readily replaced.

The principles of this invention may be adapted to utilize a liquid instead of a gas as the impelling fluid. Fig. 4 diagrammatically illustrates such an adaptation. In this figure, reference numeral 9" represents a turbine rotor attached to an aircraft landing wheel and 30" represents a nozzle carried by a relatively stationary or fixed part of an aircraft. A conduit 32" leads back from the nozzle to a tank 14" containing liquid such as water. A source of compressed air 27" is connected through conduit 29" including valve 28" to the liquid container 14".

When it is desired to start the wheel, valve 28" is opened and compressed air from tank 27" forces liquid from the tank 14" through conduit 32" to nozzle 30". The nozzle directs a high velocity stream of liquid against the blades of the turbine rotor 9" causing the latter to turn the landing wheel to which it is attached.

From the foregoing description, it is evident that the present invention provides a simple yet efficient wheel starter for aircraft landing gear utilizing fluid driven turbine means for rotating the wheel.

Obviously, the invention is not restricted to the particular embodiments thereof herein shown and described. Various changes may be made without departing from the spirit of the invention as set forth in the appended claims.

I claim:

1. In an aircraft landing gear of the character described, in combination, a landing wheel strut; a landing wheel rotatably mounted on said strut; a turbine rotor carried by said wheel; blades having inlet edges on said rotor a cartridge supporting frame fixed to said strut adjacent said wheel; a cartridge having an open-ended case defining a nozzle orifice supported on said frame, the orifice of said case being positioned closely adjacent the blades of said rotor and so constructed as to conform to a sector of the path of the inlet edges of said blades and to direct a stream of impelling gas against the blades of said turbine rotor, said cartridge containing an explosive charge; electric firing means for igniting said charge; a source of electric current; and circuit means including an operating switch connecting said source of current to said firing means.

2. The combination defined in claim 1 wherein the turbine rotor is constructed and arranged for radial flow of impelling fluid between the blades.

3. The combination defined in claim 1 wherein the turbine rotor is constructed and arranged for axial flow of impelling fluid between the blades.

4. In an aircraft landing gear of the character described, in combination, a landing wheel strut; a landing wheel rotatably mounted on said strut; a bladed turbine rotor carried by said wheel; a safety screen carried by said wheel and interposed between the low pressure side of said turbine rotor and the atmosphere, whereby exhaust gases from said rotor will pass through the screen to the atmosphere; a cartridge supporting frame fixed to said strut adjacent said wheel; a cartridge having an open-ended case defining a nozzle orifice supported on said frame, the orifice of said case being positioned to direct a stream of impelling gas against the blades of said turbine rotor, said cartridge containing an explosive charge, electric firing means for igniting said charge, a source of electric current; and circuit means including an operating switch connecting said source of current to said firing means.

5. In an aircraft landing gear of the character described, in combination, a landing wheel strut; a landing wheel rotatably mounted on said strut; a bladed turbine rotor carried by said wheel; a safety screen carried by said wheel and interposed between the low pressure side of said turbine rotor and the atmosphere, whereby exhaust gases from said rotor will pass through the screen to the atmosphere; a cartridge supporting frame fixed to said strut adjacent said wheel; a cartridge having an open ended case supported on said frame, the open end of said case being positioned to direct a stream of impelling gas against the blades of said turbine rotor, said cartridge containing an explosive charge, electric firing means for igniting said charge, a source of electric current; and circuit means including an operating switch connecting said source of current to said firing means.

6. In an aircraft landing gear of the character described, in combination, a landing wheel strut; a landing wheel rotatably mounted on said strut; a bladed turbine rotor carried by said wheel; a cartridge supporting frame fixed to said strut adjacent said wheel; a plurality of cartridges spaced uniformly around said rotor, each said cartridge having an open ended case, the open end of which defines a nozzle orifice positioned adjacent the blades of said rotor to direct a stream of impelling gas therefrom against the blades of said turbine rotor; electric firing means for detonating said cartridges; a source of electric current; and circuit means including an operating switch connecting said source of current to said firing means.

CARL R. LIVERMON.

REFERENCES CITED

The following references are of record in the file of this patent:

UNITED STATES PATENTS

| Number | Name | Date |
|---|---|---|
| 160,763 | Freund | Mar. 16, 1875 |
| 657,124 | Libbey | Sept. 4, 1900 |
| 783,114 | Flucks | Feb. 21, 1905 |
| 1,267,257 | Murray | May 21, 1918 |
| 1,884,479 | Woolson | Oct. 25, 1932 |
| 2,154,572 | Lansing | Apr. 18, 1939 |
| 2,296,117 | Pevney | Sept. 15, 1942 |
| 2,316,682 | Finnegan | Apr. 13, 1943 |
| 2,365,126 | Vickers et al. | Dec. 12, 1944 |
| 2,370,316 | Juul | Feb. 27, 1945 |
| 2,372,207 | Kendrick | Mar. 27, 1945 |
| 2,411,552 | New | Nov. 26, 1946 |

FOREIGN PATENTS

| Number | Country | Date |
|---|---|---|
| 700,357 | Germany | Dec. 18, 1940 |